(12) United States Patent
Wei-An

(10) Patent No.: US 7,423,814 B2
(45) Date of Patent: Sep. 9, 2008

(54) CAMERA LENS FOCUS-SETTING MECHANISM

(75) Inventor: Huang Wei-An, Shulin (TW)

(73) Assignee: Protech Optronics Co., Ltd., Shulin (TW)

( * ) Notice: Subject to any disclaimer, the term of this patent is extended or adjusted under 35 U.S.C. 154(b) by 182 days.

(21) Appl. No.: 11/514,340

(22) Filed: Sep. 1, 2006

(65) Prior Publication Data

US 2008/0055746 A1 Mar. 6, 2008

(51) Int. Cl.
*G02B 15/14* (2006.01)
*G02B 7/02* (2006.01)

(52) U.S. Cl. .................. 359/694; 359/696; 359/701; 359/823

(58) Field of Classification Search ......... 359/694–701, 359/823
See application file for complete search history.

(56) References Cited

U.S. PATENT DOCUMENTS 5,701,532 A * 12/1997 Inaba .................. 396/326

\* cited by examiner

*Primary Examiner*—Ricky L Mack
*Assistant Examiner*—Mahidere S Sahle
(74) *Attorney, Agent, or Firm*—Troxell Law Office, PLLC

(57) ABSTRACT

A camera lens focus-setting mechanism enabling easy and precise focusing includes a first and a second rack member, and a first and a second adjusting assembly. The first and the second rack member are respectively associated with a first and a second focusing ring, which are respectively mounted around first and second lens holders on a camera, and the first and the second adjusting assembly are located corresponding to the first and the second rack member, respectively. Each of the first and the second adjusting assembly includes a turning bar and a gear driven to rotate by the turning bar, and the two gears separately mesh with racks on the two rack members. By turning the turning bars, the first and the second focusing ring are independently rotated to shift the first and the second lens holder of the camera forward or rearward.

9 Claims, 6 Drawing Sheets

CAMERA LENS FOCUS-SETTING MECHANISM

FIELD OF THE INVENTION

The present invention relates to a camera lens focus-setting mechanism, and more particularly to a mechanism for easily and precisely setting the focus of a camera used in a surveillance system, so as to enhance the quality of images captured by the camera.

BACKGROUND OF THE INVENTION

All the commercially available surveillance systems include a camera with a zoom lens. An operator would usually manually adjust the focal length to obtain clear images for surveillance purpose. Please refer to FIGS. 1 and 2 that are assembled and exploded perspective views, respectively, of a conventional zoom lens 10. As shown, the zoom lens 10 includes a first lens holder 11 and a second lens holder 12. The first lens holder 11 is located at an outer end of the zoom lens 10 and is a focusing lens assembly. The second lens holder 12 is located at an inner end of the zoom lens 10 and is a zoom lens assembly. A surveillance camera may be set to desired surveillant distance and angle of view by adjustably moving the first and the second lens holder 11, 12 forward or rearward.

Three projections 111, 121 are equally spaced along the circumferential surface of the first and the second lens holder 11, 12, respectively. The projections 111, 121 may be screwed to or integrally formed on the first and the second lens holder 11, 12. A barrel of the zoom lens 10 is provided with curved guide grooves 13, 14, corresponding to the projections 111, 121, respectively. When the three projections 111, 121 are moved in the corresponding guide grooves 13, 14, the first and the second lens holder 11, 12 are respectively adjusted in position relative to the zoom lens 10. Moreover, a first and a second focusing ring 15, 16 are respectively mounted to a front and a rear end of the zoom lens 10. The first and the second focusing ring 15, 16 are respectively provided on an inner wall surface with three axially extended linear channels 151, 161 corresponding to the projections 111, 121 on the first and the second lens holder 11, 12. When the first and the second focusing ring 15, 16 are rotated, the channels 151, 161 respectively bring the first and the second lens holder 11, 12 to rotate. When the first and the second lens holder 11, 12 are rotating, the projections 111, 121 thereon are moved along the curved guide grooves 13, 14, respectively, causing the first and the second lens holder 11, 12 to shift forward or rearward. To facilitate easy focus setting, the first and the second focusing ring 15, 16 are provided with a handling lever 152, 162 each, so that the first and the second focusing ring 15, 16 could be conveniently turned.

To set focus for the above-described surveillance camera, it is necessary to open a case or an operating cover of the camera (not shown), so as to expose and move the handling levers 152, 162. Since the handling levers 152, 162 are directly moved with fingers, it is not easy for an operator to move the first and the second lens holder 11, 12 to the most accurate position, bringing confusions to the operator during focus-setting.

It is therefore tried by the inventor to develop a camera lens focus-setting mechanism to allow easy and precise focus-setting using only a driver without the need of open the case or any operating cover of the camera.

SUMMARY OF THE INVENTION

A primary object of the present invention is to provide a camera lens focus-setting mechanism that could be manually operated to achieve a fine adjustment and thereby enables easy and precise focusing.

To achieve the above and other objects, the camera lens focus-setting mechanism according to the present invention includes a first and a second rack member, and a first and a second adjusting assembly. The first and the second rack member are associated with a first and a second focusing ring on a camera, respectively, to form a united body, while the first and the second focusing ring are respectively mounted around a first and a second lens holder of the camera; and the first and the second adjusting assembly are located corresponding to the first and the second rack member, respectively. The first adjusting assembly includes a turning bar and a gear driven to rotate by the turning bar, and the gear meshes with a rack on the first rack member. Therefore, by turning the turning bar of the first adjusting assembly, the first lens holder of the camera is shifted forward or rearward. Similarly, the second adjusting assembly includes a turning bar and a gear driven to rotate by the turning bar, and the gear meshes with a rack on the second rack member. Therefore, by turning the turning bar of the second adjusting assembly, the second lens holder of the camera is shifted forward or rearward.

The turning bars of the first and second adjusting assemblies are provided at respective outer end surface with a slot for engaging with a corresponding driver tip. Thus, an operator may easily and precisely adjust the first and second lens holders to desired positions simply by using a driver corresponding to the slots on the turning bars of the first and second adjusting assemblies.

When the camera lens focus-setting mechanism of the present invention is enclosed in a housing of a camera, the camera housing may be provided with two small apertures corresponding to the two turning bars for a driver to extend therethrough.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
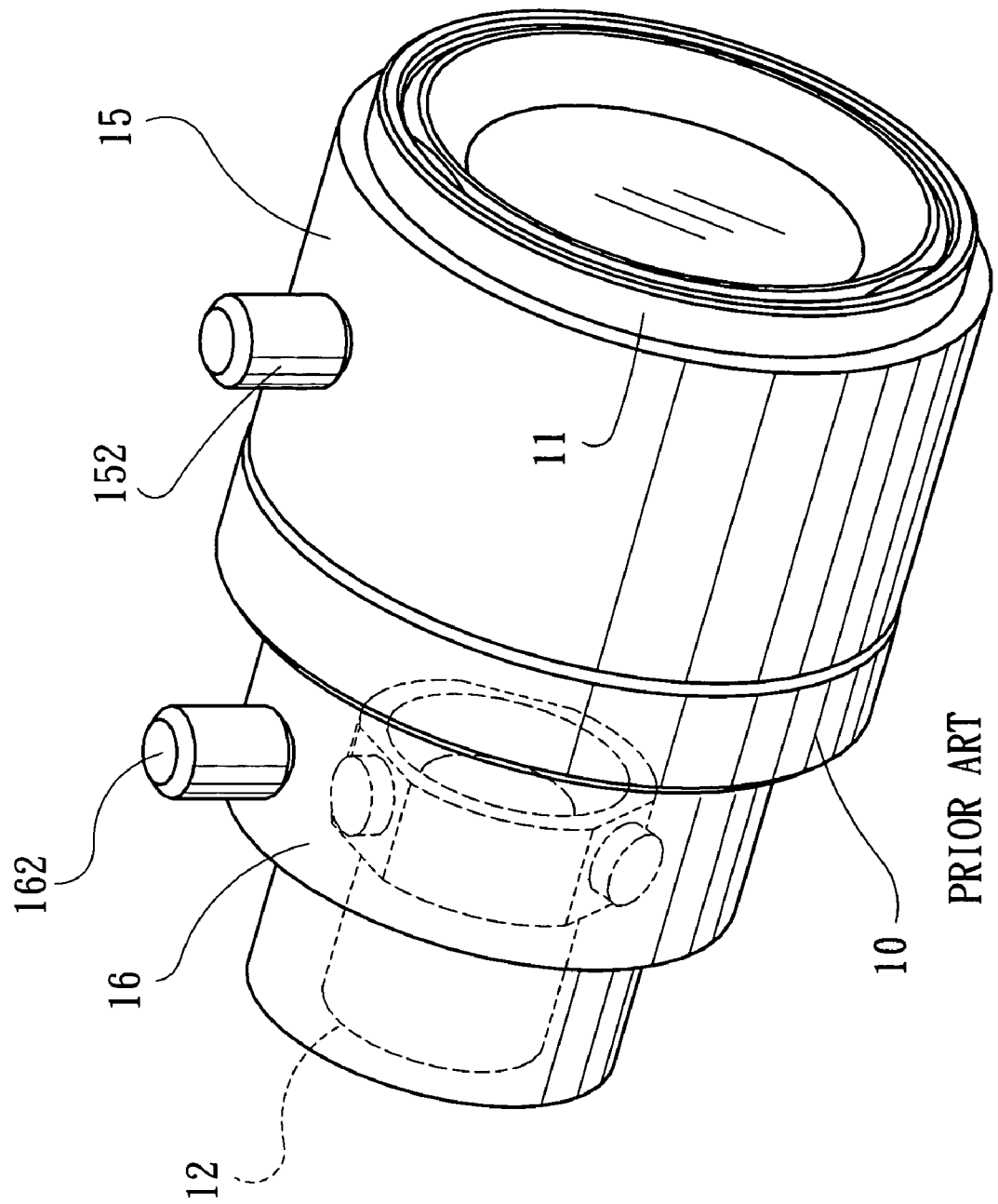
FIG. 1 is a perspective view of a conventional camera lens.
Figure 2:
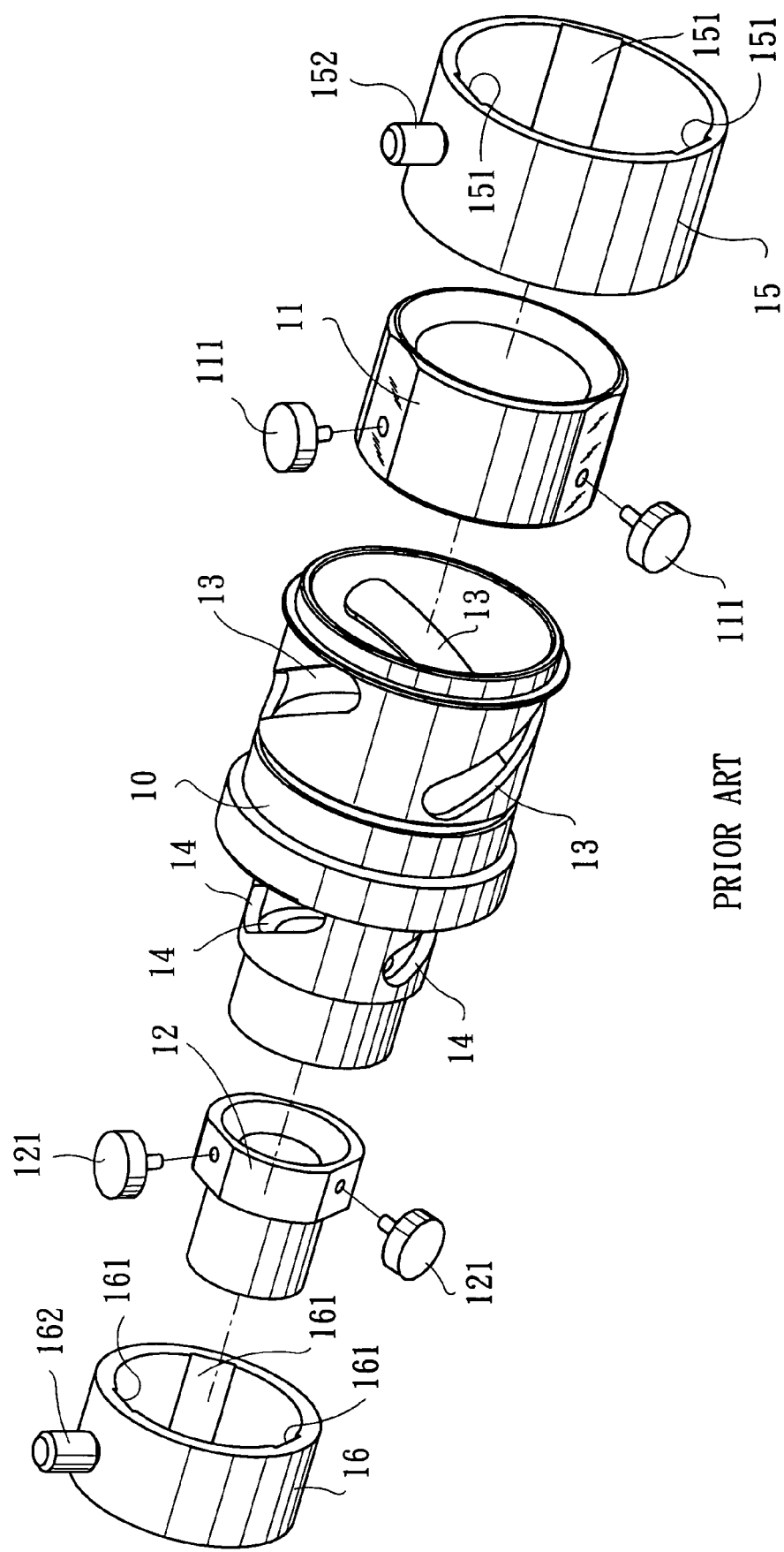
FIG. 2 is an exploded view of FIG. 1.
Figure 3:
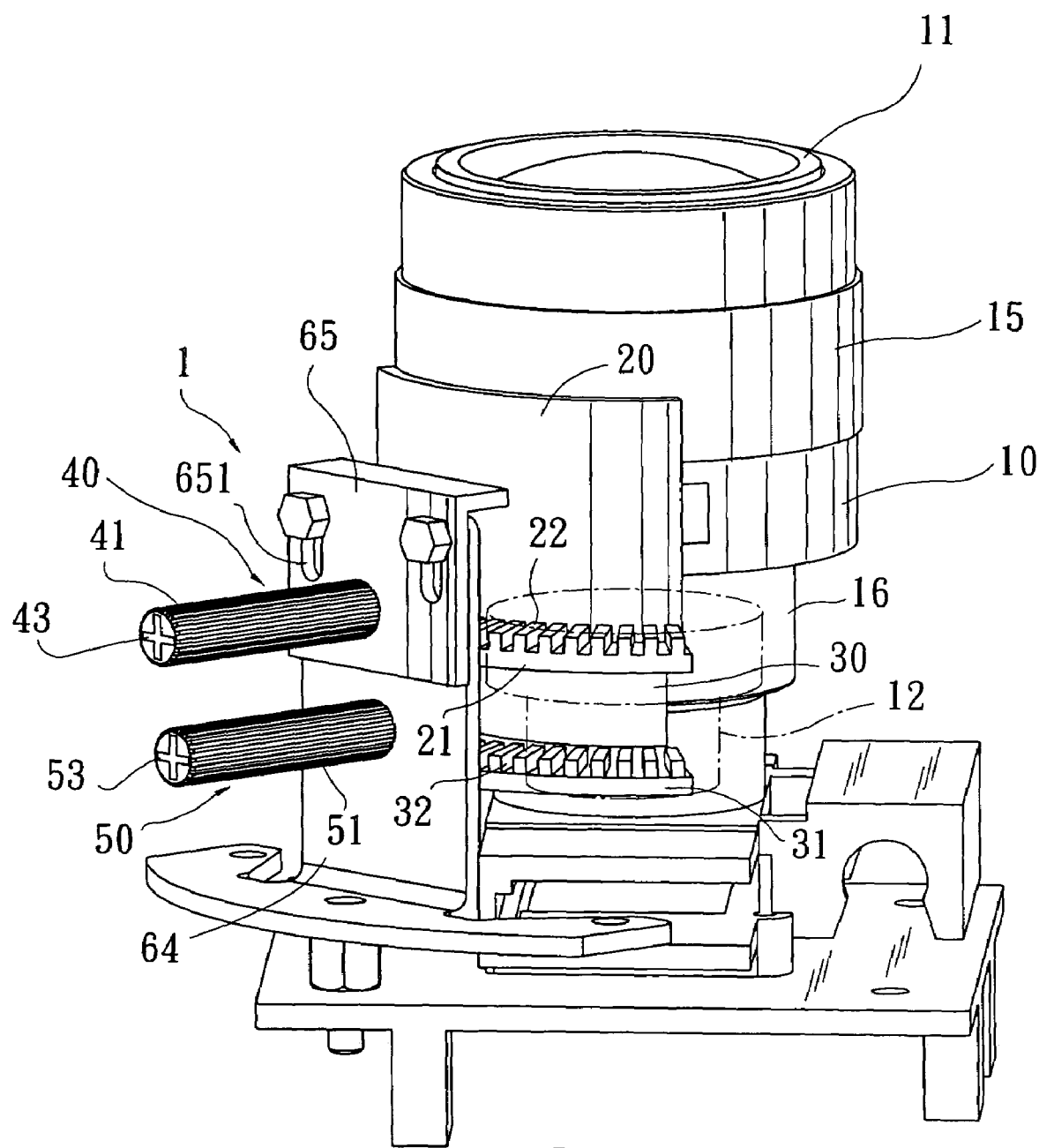
FIG. 3 is a perspective view showing a focus-setting mechanism of the present invention associated with a camera lens.

Please refer to FIG. 3 that is an assembled perspective view of a camera lens focus-setting mechanism 1 according to a preferred embodiment of the present invention. As shown, the focus-setting mechanism 1 is associated with a camera lens 10 generally available in the market. The lens 10 includes a first lens holder 11 located at a front end of the lens 10, a second lens holder 12 located at a rear end of the lens 10, and a first and a second focusing ring 15, 16 rotatably mounted around the first and the second lens holder 11, 12, respectively. When the first and the second focusing ring 15, 16 are rotated, the first and the second lens holder 11, 12 are respectively brought to shift forward or rearward to thereby set the camera to desired surveillant distance and angle of view.

The focus-setting mechanism 1 of the present invention is mainly used to adjust the above-mentioned lens 10 to a desired focal length, so that the camera could capture clear images of places under surveillance. The focus-setting mechanism 1 includes a first rack member 20, a second rack member 30, a first adjusting assembly 40, and a second adjusting assembly 50. The first and the second rack member 20, 30 are located corresponding to the first and the second focusing ring 15, 16, respectively, and the first and the second adjusting assembly 40, 50 are located corresponding to the first and the second rack member 20, 30, respectively.

Figure 4:
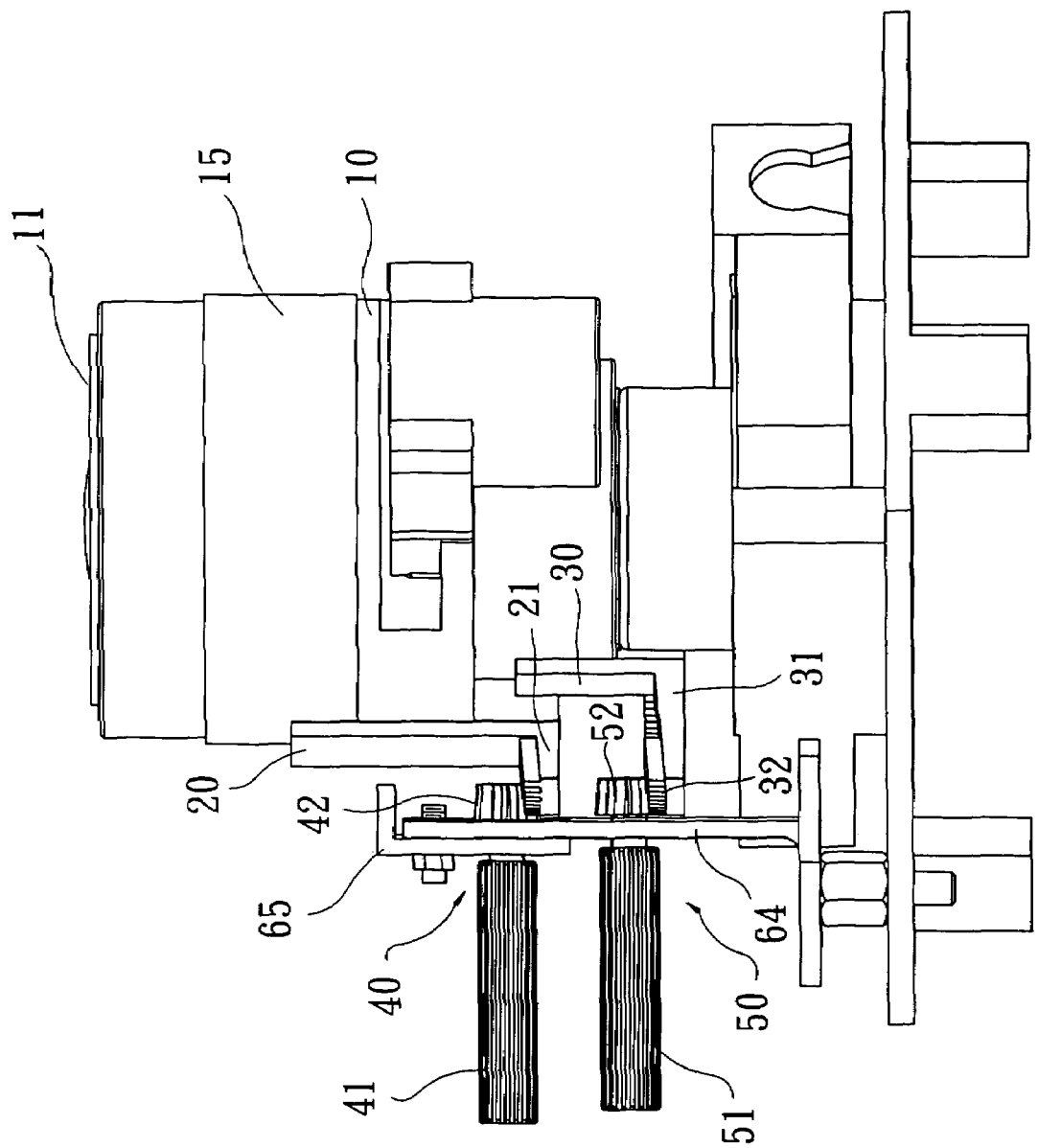
FIG. 4 is a side view of FIG. 3.

Please refer to FIG. 4 that is a side view of FIG. 3. The first rack member 20 is associated with the first focusing ring 15 to form a united body. The first rack member 20 includes a radially outward extended lower end 21, on and along an upper side of which a curved rack 22 is extended. The rack 22 and a ring body of the first focusing ring 15 are concentric with each other. The first adjusting assembly 40 includes a turning bar 41, and a gear 42 driven to rotate by the turning bar 41. The gear 42 meshes with the rack 22 on the first rack member 20, so that the gear 42 being rotated by the turning bar 41 is able to cause the first rack member 20 and the first focusing ring 15 to rotate synchronously, and thereby brings the first lens holder 11 to shift forward or backward. The turning bar 41 has an outer end surface provided with a slot 43 for engaging with a corresponding driver tip, such that an operator may use a suitable driver to turn the turning bar 41 and achieves the purpose of easily and precisely adjusting the first lens holder 11 to a desired position.

The second rack member 30 is associated with the second focusing ring 16 to form a united body. The second rack member 30 includes a radially outward extended lower end 31, on and along an upper side of which a curved rack 32 is extended. The rack 32 and a ring body of the second focusing ring 16 are concentric with each other. The second adjusting assembly 50 includes a turning bar 51, and a gear 52 driven to rotate by the turning bar 51. The gear 52 meshes with the rack 32 on the second rack member 30, so that the gear 52 being rotated by the turning bar 51 is able to cause the second rack member 30 and the second focusing ring 16 to rotate synchronously, and thereby brings the second lens holder 12 to shift forward or backward. The turning bar 51 has an outer end surface provided with a slot 53 for engaging with a corresponding driver tip, such that an operator may use a suitable driver to turn the turning bar 51 and achieves the purpose of easily and precisely adjusting the second lens holder 12 to a desired position.

The first and the second rack member 20, 30 may be bonded to the first and the second focusing ring 15, 16, respectively, to form two united bodies.

Alternatively, the first and the second rack member 20, 30 may be locked to the first and the second focusing ring 15, 16, respectively, using screws (not shown).

Figure 5:
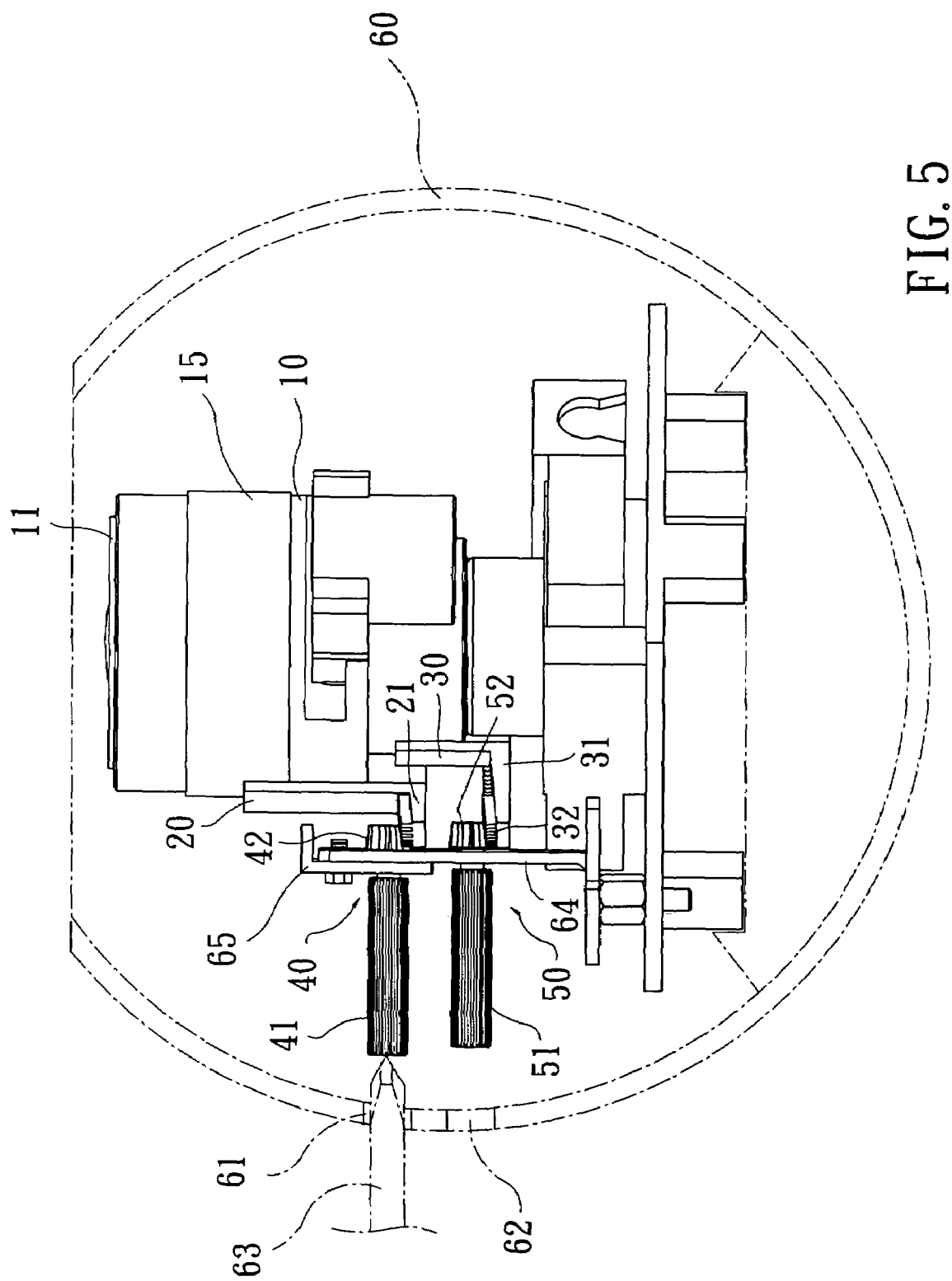
FIG. 5 schematically shows the camera lens with the focus-setting mechanism of the present invention as shown in FIG. 3 is mounted in an eyeball-shaped camera housing.

FIG. 5 shows the focus-setting mechanism 1 of the present invention is employed on an eyeball-shaped camera to set a focus of the camera lens 10. The eyeball-shaped camera includes a housing 60, on which two small apertures 61, 62 are provided corresponding to the turning bars 41, 51, respectively. An operator may extend a driver 63 through the apertures 61, 62 to separately adjust the first and the second lens holder 11, 12 (see FIG. 3) to desired positions.

Figure 7:
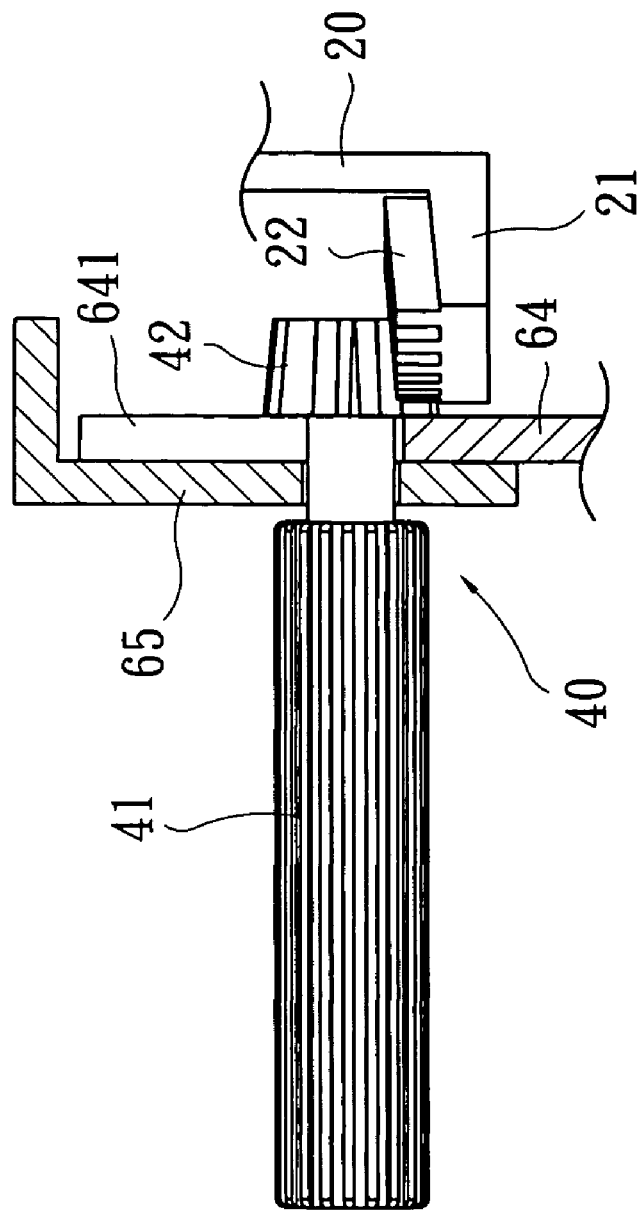
FIG. 7 is another fragmentary sectioned view of the present invention.
Figure 6:
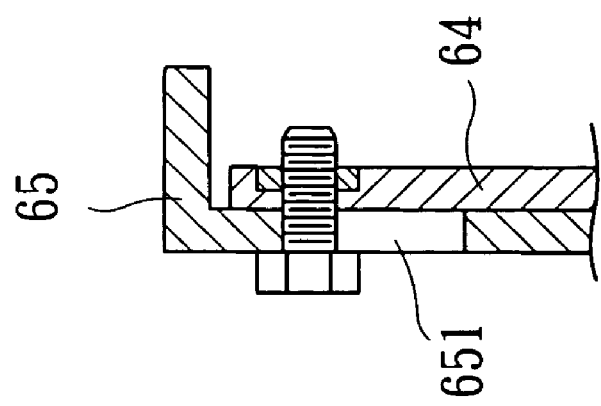
FIG. 6 is a fragmentary sectioned side view of the present invention.

To facilitate easy assembling of the focus-setting mechanism 1 to the lens holders 15, 16, the first and the second adjusting assembly 40, 50 may be mounted on the same one bracket. However, in the illustrated embodiment, the second adjusting assembly 50 is mounted on a fixed bracket 64, while the first adjusting assembly 40 is mounted on a movable bracket 65, which is adjustably screwed to the fixed bracket 64 via locking holes. Please refer to FIG. 6. The locking holes on the movable bracket 65 are two long holes 651 to allow adjustment of the position of the movable bracket 65 relative to the fixed bracket 64, so that the first and the second adjusting assembly 40, 50 could be adjusted to positions corresponding to the first and the second rack member 20, 30, respectively. Please refer to FIG. 7. The fixed bracket 64 is provided near a front end with a long slot 641, through which the first adjusting assembly 40 is guided to engage with the first rack member 20.

The camera lens focus-setting mechanism of the present invention has simple structure and allows easy focus setting by an operator to achieve the best camera effect without the need of open the housing of the camera.

What is claimed is:

1. A camera lens focus-setting mechanism, said camera lens including a first lens holder located at a front end of said camera lens, a second lens holder located at a rear end of said camera lens, and a first and a second focusing ring rotatably mounted around said first and said second lens holder, respectively, so that rotating of said first and said second focusing ring would bring said first and said second lens holder, respectively, to shift forward or rearward; said focus-setting mechanism comprising:

a first rack member associated with said first focusing ring on said first lens holder, and including a radially outward projected lower end, on and along an upper side of which a curved first rack is extended, and said first rack being concentric with a ring body of said first focusing ring;

a second rack member associated with said second focusing ring on said second lens holder, and including a radially outward projected lower end, on and along an upper side of which a curved second rack is extended, and said second rack being concentric with a ring body of said second focusing ring;

a first adjusting assembly including a first turning bar, and a first gear driven to rotate by said first turning bar; said first gear meshing with said first rack on said first rack member, so that said first gear being rotated by said first turning bar is able to cause said first focusing ring to rotate synchronously; and said first turning bar being provided at an outer end surface with a slot for engaging with a corresponding driver tip; and a second adjusting assembly including a second turning bar, and a second gear driven to rotate by said second turning bar; said second gear meshing with said second rack on said second rack member, so that said second gear being rotated by said second turning bar is able to cause said second focusing ring to rotate synchronously; and said second turning bar being provided at an outer end surface with a slot for engaging with a corresponding driver tip.

2. The camera lens focus-setting mechanism as claimed in claim 1, wherein said first rack member is integrally formed on said first focusing ring.

3. The camera lens focus-setting mechanism as claimed in claim 1, wherein said second rack member is integrally formed on said second focusing ring.

4. The camera lens focus-setting mechanism as claimed in claim 1, wherein said first rack member is bonded to said first focusing ring.

5. The camera lens focus-setting mechanism as claimed in claim 1, wherein said second rack member is bonded to said second focusing ring.

6. The camera lens focus-setting mechanism as claimed in claim 1, wherein said first rack member is screwed to said first focusing ring.

7. The camera lens focus-setting mechanism as claimed in claim 1, wherein said second rack member is screwed to said second focusing ring.

8. The camera lens focus-setting mechanism as claimed in claim 1, wherein said second adjusting assembly is mounted on a fixed bracket while said first adjusting assembly is mounted on a movable bracket, and said movable bracket is adjustably screwed to said fixed bracket via locking holes.

9. The camera lens focus-setting mechanism as claimed in claim 8, wherein said locking holes on said movable bracket are two long holes to allow adjustment of a position of said movable bracket relative to said fixed bracket, such that said first and said second adjusting assembly could be adjusted to positions corresponding to said first and said second rack member, respectively.

\* \* \* \* \*